United States Patent [19]

Schumacher, II et al.

[11] 4,286,425
[45] Sep. 1, 1981

[54] CUTTER FINGER FOR CUTTER BAR MOWERS

[76] Inventors: Gustav Schumacher, II, Gartenstrasse 8, 5231 Eichelhardt; Günter Schumacher, Raiffeisenstrasse 10, 5231 Eichelhardt, both of Fed. Rep. of Germany

[21] Appl. No.: 103,951

[22] Filed: Dec. 14, 1979

[30] Foreign Application Priority Data

Dec. 21, 1978 [DE] Fed. Rep. of Germany ...... 2855234

[51] Int. Cl.³ .......................................... A01D 55/10
[52] U.S. Cl. .................................................. 56/307
[58] Field of Search .............................. 56/307–313, 56/298

[56] References Cited

U.S. PATENT DOCUMENTS

| 770,892 | 9/1904 | Crates | 56/304 |
|---|---|---|---|
| 992,691 | 5/1911 | Lowe et al. | 56/304 |
| 2,234,783 | 3/1941 | Snow | 56/307 |
| 3,553,948 | 1/1971 | White | 56/307 |
| 3,699,758 | 10/1972 | Scarnato et al. | 56/307 |

FOREIGN PATENT DOCUMENTS 18464 of 1901 United Kingdom .................... 56/307

Primary Examiner—Robert A. Hafer
Attorney, Agent, or Firm—Steinberg & Raskin

[57] ABSTRACT

The invention relates to a cutter finger for cutter bar mowers comprising a lower portion bolted at the end to the cutter bar and including a forwardly projecting cutter finger tip from which the upper portion of said finger extends to the rear thus forming the cutter blade slit and constituting together with said lower portion the counter edges for the mower knife wherein said upper portion of said finger is extended to, and supported at, and if necessary bolted at said cutter bar.

9 Claims, 9 Drawing Figures

CUTTER FINGER FOR CUTTER BAR MOWERS

The invention relates to a cutter finger for cutter bar mowers, which are mainly employed in harvesters.

Cutter bar mowers wherein the cutter fingers constitute the counter edge for preferably triangular mower knife blades have been known for a long time. The fingers are either prepared as a drop forging or as a cast piece and comprise essentially a rigid lower portion of the finger screwed at the rear end thereof to the cutter bar, the pointed forwardly projecting finger tip, and the finger lip, or upper portion of the finger, which extends from the finger tip to the rear and forms together with the lower portion of the finger a slit within which the cutter blade is moved to and fro. The lateral flanks of the cutter finger, of the lower portion as well as of the upper portion of the cutter finger, constitute, in the range of the mower cutter blade, the counter edge for the mower knife.

In these prior art cutter fingers, all the vertical forces acting upon the cutter finger for instance in view of the unevenness of the ground or of additional devices attached to the cutter finger, such as grain lifters, are absorbed by the lower portion of the finger.

All the horizontal forces, which are transferred by the material to be cut and by foreign bodies sometimes encountered from the to and fro moving cutter blade to the cutter finger have to be absorbed by the lower portion of the finger as well. The lower portion of the finger is therefore shaped rather rigidly in order to absorb all these forces acting on it in the horizontal direction and to this end the cutter fingers are furtheron provided with distance wings each adjacent the distance wings of the neighboring finger.

In the latest devices, two cutter fingers each are solidly secured to each other via such distance wings, that is, they are frequently shaped as one piece and are termed in this form as "double fingers". By means of such double finger shaped cutter fingers, horizontally attacking forces may be absorbed relatively well. The "double fingers" may on the other hand also be provided with lateral distance wings which, on their side, contact the distance wings of the neighboring double fingers and thus support each other. In this way, a still greater stability of the cutter fingers relative to the forces attacking in horizontal direction is obtained.

The upper portion of the finger, also termed the finger lip, is however very frequently not designed to bear the horizontally attacking forces, as this upper portion is secured only with one of its ends to the finger tip. The forces attacking at its free end cause therefore, because of the long lever action, that the upper portion of the finger is frequently torn away.

As concerns the vertical forces, no satisfactory solution was hitherto found to sufficiently absorb them as they are solely transferred via the lower portion of the cutter finger onto the cutter bar. In order to avoid damages caused by the vertical forces, the cutter fingers and particularly the lower portions of the cutter fingers must be very sturdily constructed in order to bear the forces coming up in vertical direction.

It has already been attempted to replace the finger lip by an additional finger pressure plate which with one end thereof is screwed by the cutter finger clamping bolt to the cutter bar and with the other end thereof engages into a recess at the finger tip. The plate prepared from spring steel is so tightened under a bias that a counter pressure acts on the finger tip. The cutter finger is at the same time pressed downwardly to a limited extent so that the upwardly directed forces attacking at the cutter finger are compensated for. Such a structure however is completely unsuitable for downwardly directed forces as caused particularly by accessory devices such as grain lifters and the like as it would support such forces rather than to compensate for them.

As the pressure plate is not solidly connected to the finger tip but is as exposed to the horizontal forces of the cutter mower as is the lower portion of the cutter finger, two neighboring pressure plates each must be connected by a connecting bar so that they are not pushed out of the recess in the finger tip. This connecting bar has however been provided over the cutter blade and obstructs the sliding off of the mown material so that on the whole the finger pressure plate does not constitute a satisfactory solution of the problem.

The necessary stability of the lower portion of the cutter finger can therefore be reached only by a rather expensive manufacturing procedure. The cutter fingers are therefore relatively expensive as in the ordinarily drop-forged cutter fingers the slit for the mower knife and for the formation of the finger lip has to be milled in as the cutting edge for the mower knife must be exactly in parallel to the latter.

It is therefore the aim of the present invention to provide an essentially lighter cutter finger, which is also less expensive in manufacture, for cutter bar mowers, which is nevertheless sufficiently rigid to make possible the attachment of accessory devices such as grain lifters, glide skids and the like on the cutter finger.

According to the invention, the problem is solved by a cutter finger for cutter bar mowers comprising a lower portion bolted at the end to the cutter bar and including a forwardly projecting cutter finger tip from which the upper portion of the finger extends to the rear thus forming the cutter blade slit and constituting together with the lower portion the counter edges for the mower knife, the cutter finger of the invention being characterized in that the upper portion of the finger is extended to, and supported at, the cutter bar.

By this embodiment according to the invention, the upwardly directed vertical forces acting onto the cutter finger are in a simple way absorbed while no additional mounting means are necessary, which as described in the beginning in connection with the finger pressure plate obstruct the gliding off of the mown material.

In accordance with a further particularly advantageous embodiment of the present invention, the upper portion of the finger is bolted at its end to the cutter bar.

Such an embodiment compensates in a simple way for the upwardly directed forces as well as the downwardly directed forces while, when bolting of the free end of the upper portion of the cutter finger is made by means of the cutter finger clamping bolt, no additional mounting means are necessary, which constitutes an advantage with a view to the costs and avoids an obstruction of the mown material in practical operation.

In such an embodiment, all forces attacking in vertical direction at the cutter finger are absorbed in an optimum way. In case of an upward force, pressure forces are transferred onto the upper portion and tractional forces are transferred onto the lower portion, and in case of a downward force, tractional forces are transferred onto the upper portion and pressure forces onto the lower portion.

Particularly in the mower cutters for harvesters known today, downward load is experienced to an increasing extent. Contrary to the cutter mowers for grass and other kings of green fodder, the cutter fingers are not in contact with, and in parallel to, the longitudinal axis thereof above the ground but rather have a downwardly directed angle of from about 13 to 20°. If the tip hits upon an obstacle, it is in view of the additionally acting motion resistance especially strongly drawn downwardly.

In the cutter fingers produced in accordance with the invention, the lower portion and the upper portion of the finger are suitably manufactured as drop forgings. In accordance with a further advantageous embodiment of the present invention, the lower portion and the upper portion of the fingers are made as cast pieces.

It has shown to be particularly suitable if the lower portion and the upper portion of the finger are manufactured as stamped metal parts considering that such a manufacturing process is relatively cheap. The upper portion and the lower portion of the finger may either be made as one piece, which is possible particularly in the manufacturing according to the drop forging method or according to the casting method, or they may suitably be welded together, riveted or bolted together before the cutter slit. The latter three embodiments are particularly suited for cutter fingers of the invention where the lower portion and the upper portion of the finger are manufactured as stamped metal parts.

In view of the fact that, as has already been mentioned, the tip of the cutter figer includes a downwardly directed angle of from about 13 to 20° when guided in the operation of the harvester thresher over the ground, it is no longer necessary to make the lower side of the cutter finger without any projections, that is to make it particularly slidable in order to avoid the fixation of stalk portions, weeds or earth. There are no difficulties in assembling the cutter finger as described in the above embodiments of the invention from different elements and to connect them by welding, riveting or screwing together. A particular finishing of the lower side of the cutter finger is as a rule not necessary so that the manufacture of the cutter finger according to the invention shows to be particularly simple and economic.

In accordance with a further advantageous embodiment of the present invention, the lower portion and/or the upper portion of the finger is, or are, respectively, provided at the outside thereof with a reinforcing rib. Such a reinforcing rib gives the cutter finger of the invention an additional stability while the dimensions of the elements and particularly the weight of the cutter finger according to the invention are not excessively increased.

In the cutter finger of the invention, the cutter rail together with the cutting knives, triangular as a rule, secured thereto, may be guided in a way known from the prior art in a seat provided within the lower portion of the finger.

In accordance with another advantageous embodiment of the present invention, a lateral cutter rail guide plate is provided between the lower portion of the cutter finger and the cutter bar which gives lateral guidance to the cutter rail.

In such an embodiment, there need be only a second guide face for the cutter rail on the other side in order to give it satisfactory guidance in operation. This renders extensive milling operations in the manufacture of the cutter fingers of the invention, which hitherto made the cutter finger relatively expensive, unnecessary.

In accordance with another advantageous embodiment of the present invention, the lateral cutter rail guide plate is arranged between the upper portion of the cutter finger and the cutter bar.

Such an embodiment, too, leads to the same advantages as described above.

It has furtheron shown to be suitable if the cutter rail guide plate is connected either directly to the lower portion of the cutter finger or to the upper portion of the cutter finger, which may be made by welding, riveting, bolting or the like.

In view of such a loose embodiment, the manifestations of wear on this cutter rail guide plate may easily be dealt with by simply replacing this cutter rail guide plate.

In accordance with a further advantageous embodiment of the present invention, the lower portion of the finger comprises a cutter plate on which the cutter knife glides to and fro and a holder for this cutter plate solidly connected thereto by welding, bolting, riveting or the like and serving for securing the lower portion to the cutter finger clamping bolt.

In manufacture, such an embodiment may extremely simply be made and possesses moreover the necessary stability to sustain all forces coming up in vertical direction at the cutter finger.

The stability of the cutter finger according to the invention is particularly further increased relative to forces that bear upon it in horizontal direction in that, in accordance with a further advantageous embodiment of the present invention, two or a plurality of individual fingers each are connected with each other by connecting bars. When connecting three or more cutter fingers to make a one-piece part a substantially higher stability is obtained, the disadvantage however is frequently that when one cutter finger is damaged all three cutter fingers have to be exchanged.

It has shown to be particularly suitable, if the connection of two or more cutter fingers is made by connecting bars each, which are provided between the individual cutter support plates of the individual cutter fingers. In accordance with further advantageous embodiments of the present invention, the lower portions and/or the upper portions of the fingers are connected by connecting bars with each other.

Further stability is obtained in accordance with the invention in that the connecting rods are profiled and that the cutter fingers of the invention or the double or multiple cutter fingers, respectively, are provided at the free sides thereof with distance wings by which they support themselves against the corresponding distance wings of the neighboring cutter finger, or double or multiple cutter finger, respectively.

Because both the upper finger as well as the lower finger are extended to the cutter bar and are secured thereto, both have the same stability relative to the horizontally acting forces of the to and fro moving cutter knife. Lower and upper fingers are therefore also suited as the counter edges for the cutter blades of the mower knife. Mower knives may therefore be employed, the ground portion of which is at the lower side of the blades. If for instance the lower cutting edges of the cutter finger are worn, the blades of the mower knife are secured with the ground portion downward and thus the sharp cutting edges of the upper finger are employed. The cutting slit between the upper and the lower finger is so tightly chosen for the alternate employment that it is little broader than the thickness of the blade.

Summarizing, it may be stated that by the present invention a new cutter finger for cutter bar mowers is provided which as compared to the prior art embodiments has a substantially greater stability, is of smaller weight and may moreover be manufactured in a substantially easier and cheaper way.

Based on the exemplified embodiments of the cutter finger according to the invention as shown in the attached drawings, the invention will now be explained in more detail. In the drawings.

Figure 1:
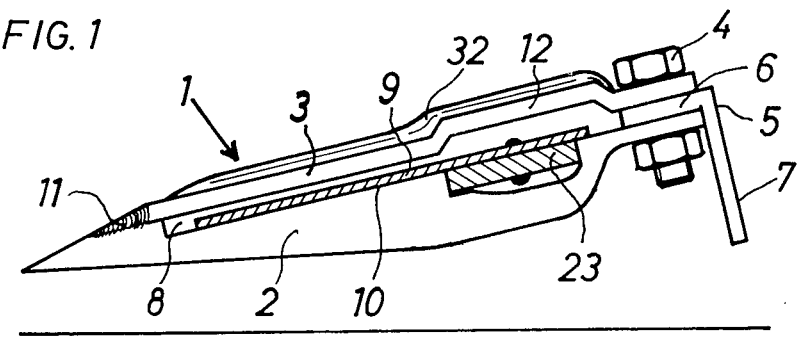
FIG. 1 is a cutter finger according to the invention the lower portion of which has been shaped in the common way.

The cutter finger 1 as shown comprises lower portion 2 of the cutter finger and upper portion 3 of the cutter finger bolted by cutter finger clamping bolt 4 to cutter bar 5. The lower portion 2 is solidly secured from below and upper portion 3 is solidly secured from above to leg 6 of cutter bar 5, which in harvester threshers or other harvesting machines is preferably angular. The leg 7 of the cutter bar is rectangularly bent downward as compared to leg 6. Between the lower and the upper portion, there is the cutter slit 8 which is formed by these two portions and which is preferably only somewhat broader than the thickness of blade 9 of the knife. The latter moves to and fro at right angles relative to the longitudinal axis of the cutter finger while the material to be cut is cut off between preferably triangular blade 9 and cutting edge 10.

FIG. 1 constitutes an embodiment where the lower portion 2 of the cutter finger has been manufactured in the common way as a drop forging or as a cast piece and the upper portion of the cutter finger is solidly and rigidly connected, at location 11, with the lower portion. In this embodiment, the connection is brought about by welding while, generally, the connection of the two portions may be soluble or not soluble as desired.

The upper porton 3 of the finger is shaped, in the range of the knife rivets, by which the blades 9 of the knife are secured to the cutter rail 23, as an arch 12. This arch may be of different height. On the cutter drive side, for instance, above the blade, the cutter head is riveted above the range of several blades. In this range, which as a rule corresponds to about the width of two double fingers, the arch should be correspondingly higher.

Based on the fact that the cutter slit 8 in the embodiment as shown is defined by the lower and upper portions of the finger, this embodiment according to the invention is substantially cheaper as compared to the embodiments hitherto known considering that it was hitherto necessary to mill in or to cut in the cutter slit, while in the embodiment of the invention only the flanks of the cutter rail guide have to be provided with parallel faces, which if a good drop forge tool is employed might even be neglected.

The provision of the lower portion of the cutter finger from one or several cold stamped metal parts, as shown in the embodiments according to FIGS. 2 through 5, is moreover substantially cheaper in manufacture while the stability as compared to the embodiments hitherto known is in no way impaired.

Figure 2:
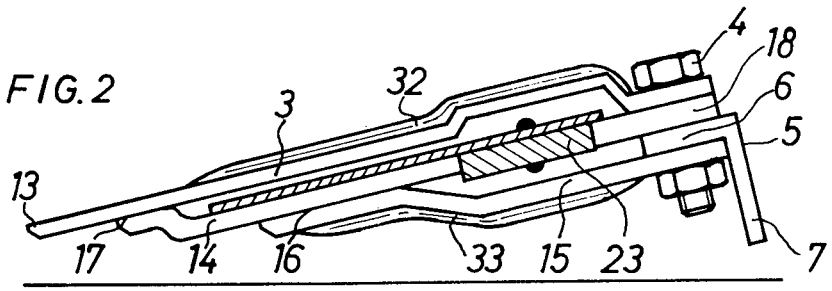
FIG. 2 is a preferred embodiment of the cutter finger according to the invention.

FIG. 2 shows an embodiment, where the upper portion 3 of the cutter finger is so far forwardly projected that it constitutes at the same time the cutter finger tip 13. The lower portion of the cutter finger comprises cutter support plate 14 and holder 15. The latter is connected, at 16, to the cutter support plate, the cutter support plate 14 is connected, at 17, to the upper portion of the cutter finger. The upper portion and the lower portion form in this way a unity, and they are both bolted by cutter finger clamping bolt 4 to leg 6 of cutter bar 5.

The greater the distance between the upper portion and the lower portion in the range of the cutter finger clamping bolt 4, the greater the stability of the cutter finger in vertical direction. For this reason, cutter rail guide plate 18 is shaped as an intermediate plate bolted, between leg 6 of cutter bar 5 and upper portion 3 of the cutter finger, also by cutter finger clamping bolt 4. The cutter rail guide plate 18 may be a separate part, which during assembling is simply inserted. It may however also be solidly secured to the upper portion 3 of the cutter finger. The provision as a separate part has the advantage that it may, as a wearing part, rapidly and cheaply be replaced.

Figure 6:
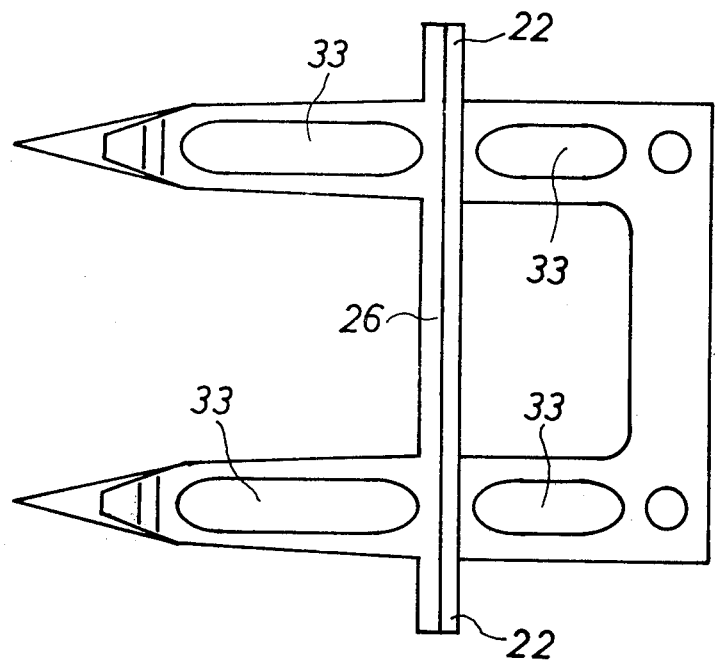
FIG. 6 is a double cutter finger according to the present invention which corresponds to the individual cutter finger according to FIG. 4 as seen from the lower side.
Figure 7:
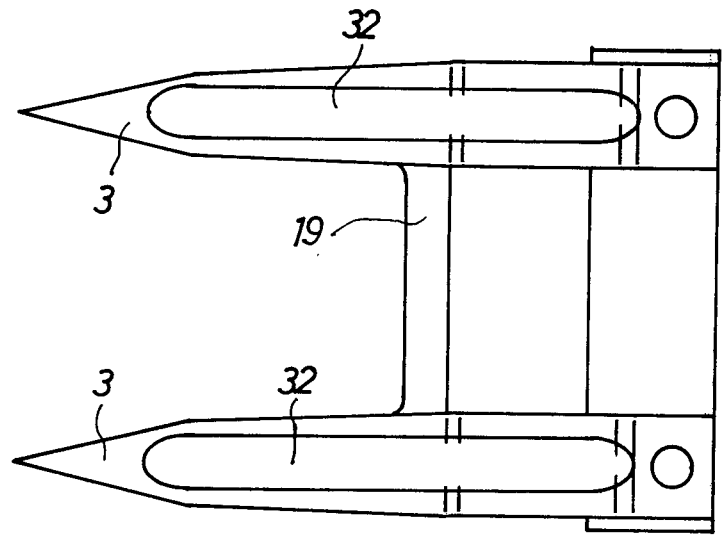
FIG. 7 is a double cutter finger according to the present invention which corresponds to the embodiment according to FIG. 2, as seen from the upper side.
Figure 8:
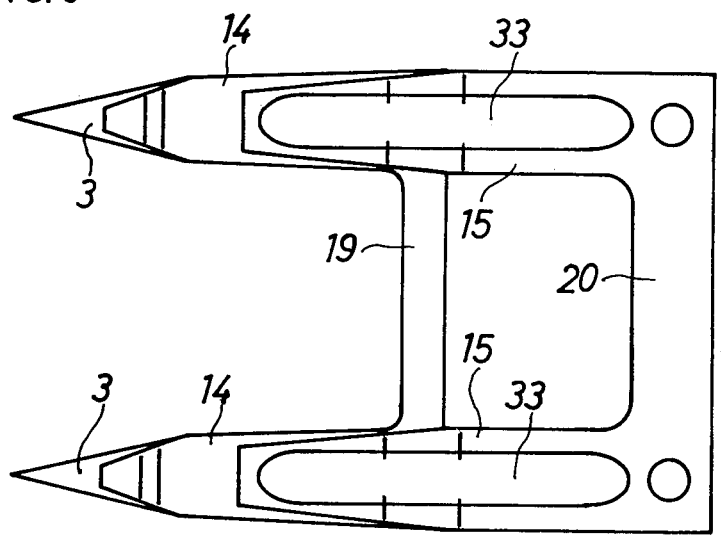
FIG. 8 is the double cutter finger according to FIG. 7 as seen from the lower side.

In order to absorb the laterally acting forces, two cutter fingers each are suitably combined in a common way to constitute one piece. FIG. 7 shows the illustration of the cutter finger described in FIG. 2 as a double finger as seen from above and FIG. 8 shows the same double finger as seen from below. The cutter support plates 14 of the two cutter fingers are connected with one another by a connecting bar 19 and are suitably shaped as one piece as a stamped metal part. Finger holders 15 are also connected by a bar 20 with one another and are also manufactured as a stamped metal part. The upper portions 3 of the cutter finger may be manufactured separately or as one piece. In the latter case, the upper portions 3 are also connected with one another by a bar (not shown) between the screw bores. By means of bars 19 and 20, a great lateral stability of the cutter fingers is obtained. In most of the cases, the distance wings 22, as shown in FIG. 6, may therefore be dispensed with. Nevertheless, they may be applied and may also be necessary in exceptional cases, for instance in case of very stony ground, as a protection for the cutter rail.

Figure 3:
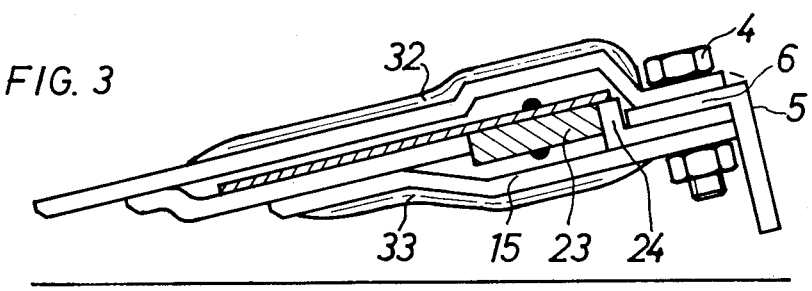
FIG. 3 is another embodiment of the cutter finger according to the invention.

In FIG. 3, a variant of the cutter finger according to FIG. 2 is shown. The cutter guide plate 24 is shaped in this embodiment as an angular piece and is arranged below connecting leg 6 of the cutter bar 5. It may either be shaped as a separate part, may be inserted and bolted by cutter finger clamping screw 4, or it may also be solidly connected to holder 15. In the latter case, connecting bar 20 in the double finger version according to FIG. 8 is not necessary as it is then formed by the cutter rail guide plate 24.

Figure 4:
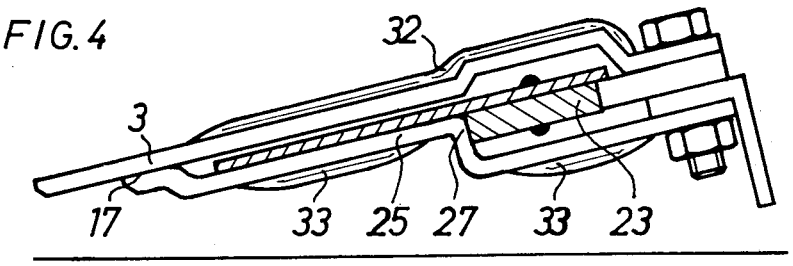
FIG. 4 is a further embodiment of the cutter finger according to the invention.

FIG. 4 shows a cutter finger according to the invention which comprises only two stamped metal parts. The lower portion 25 of the cutter finger constitutes at the same time holder and cutter plate guide and is solidly connected, at 17, to the upper portion 3 of the cutter finger. Shaped as a double finger, this embodiment of the cutter finger according to the invention includes, as shown in FIG. 6, a connecting bar 26, which is formed as an angular piece according to the bend 27 of the lower portion 25 of the finger. This increases the stability substantially.

Figure 5:
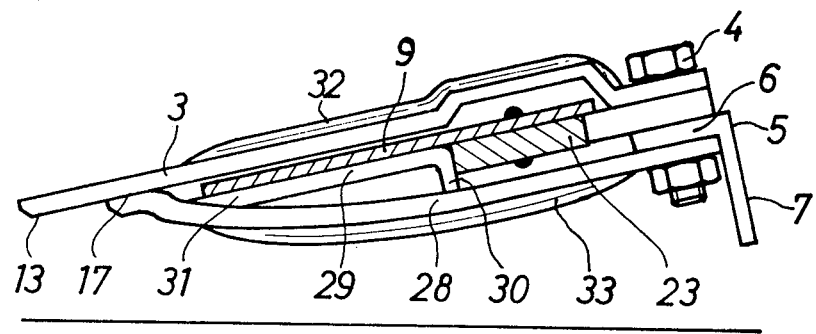
FIG. 5 is a particularly sturdy embodiment of the cutter finger according to the invention.

FIG. 5 finally shows a cutter finger according to the invention, the holding portion 28 of which is also solidly connected, at 17, to the upper portion 3 of the cutter finger in contrast to the previous embodiments however is not shouldered off but is rather form-lockingly extended up to connecting location 17. The cutter guide plate 29 is in this case shaped as an angular piece and is solidly connected, at 30 and 31, to the holder 28.

The possibilities of combination of the various elements is by no means restricted to the exemplified embodiments described in the foregoing. A different combination of the elements in the above-described structural shapes yields a plurality of further exemplified embodiments.

It should particularly be stressed that it has shown to be particularly advantageous to make one finger pair each from four elements and to weld them together at the lower side of the cutter finger. The elements may be stamped metal parts and/or forged parts and/or cast pieces.

It is commonly possible in all exemplified embodiments that the upper portion of the cutter finger and/or the lower portion of the cutter finger may be profiled at certain locations to obtain an additional rigidity and stability. As shown in examples 1 through 5, the upper portions of the fingers may be provided in the longitudinal direction with profile 32. This causes in addition to the additional stability a better gliding off of the harvested material at the upper portions. At the lower portion of the finger, profile 33, particularly on holding portion 15, leads also to rigidity and an increase of the stability against forces coming up in vertical direction at the cutter finger as well as against lateral forces.

Figure 9:
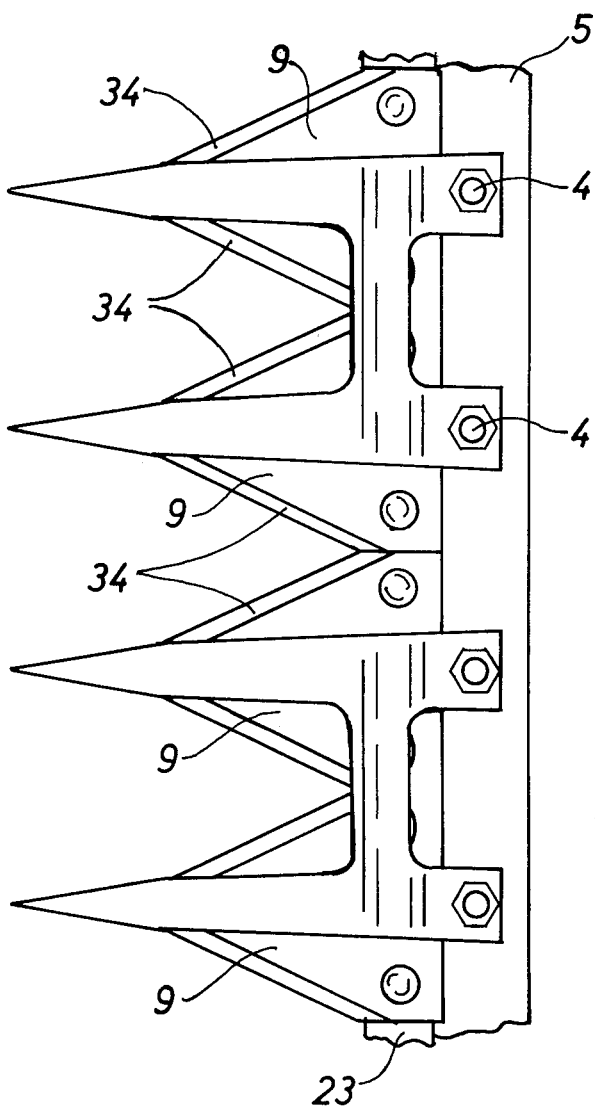
FIG. 9 is a top view of the cutter bar comprising double cutter fingers with the mower knife inserted.

The top view shown in FIG. 9 of cutter bar 5 provided with double cutter fingers shows the ground portion 34 of blades 9 connected to cutter rail 23. This ground portion 34 is provided on the upper side of the blades 9, which in operation cooperate with the lower cutting edges of blades 14 of the cutter fingers. In on the other hand, the ground portion 34 is on the lower side of blades 9, the blades 9 may cooperate, in operation, with the cutting edges of the cutter plates 14 provided on the upper portion of the cutter finger.

We claim:

1. In cutter finger apparatus for cutter bar mowers including a lower finger portion fixed to a cutter bar at a rearward end thereof and a separate upper finger portion situated over said lower finger portion and supported by said cutter bar at a rearward end thereof, said upper and lower finger portions defining a slot therebetween adapted to receive a cutter knife therein, said upper and lower finger portions each having forward ends and being fixed to each other at a location forwardly of said knife slit and bolted to each other at a location rearwardly of said knife slit, the improvement comprising: said upper and lower finger portions are each formed by stamped, metallic material; and said upper finger portion includes an end portion projecting in the forward direction beyond said forward end of said lower finger portion so that said forward end of said upper finger portion constitutes a cutter finger tip.

2. The combination of claim 1 wherein said lower and upper finger portions are each provided with a counter edge for the cutter blade.

3. The combination of claim 1 wherein said lower finger portion is provided with a reinforcing rib on the outside thereof.

4. The combination of claim 1 wherein said upper finger portion is provided with a reinforcing rib on the outside thereof.

5. The combination of claim 1 wherein said lower finger portion comprises a cutter support plate and a holder fixedly connected thereto, said cutter support plate being fixed at an end thereof to said upper finger portion and said holder being removably fixed at an end thereof to said upper finger portion.

6. The combination of claim 5 wherein said holder is shaped in form fitting relation with respect to said cutter support plate.

7. The combination of claim 5 wherein at least two cutter support plates of respective cutter fingers are mutually connected to each other by connecting bars.

8. The combination of claim 1 further including a lateral cutter rail guide plate provided between said upper finger portion and said cutter bar.

9. The combination of claim 8 wherein said lateral cutter rail plate is connected with said upper finger portion.

* * * * *

REEXAMINATION CERTIFICATE (702nd)
United States Patent [19]

Schumacher, II et al.

[11] B1 4,286,425
[45] Certificate Issued  Jun. 9, 1987

[54] CUTTER FINGER FOR CUTTER BAR MOWERS

[76] Inventors: Gustav Schumacher, II, Gartenstrasse 8; Günter Schumacher, Raiffeisenstrasse 10, both of 5231 Eichelhardt, Fed. Rep. of Germany

Reexamination Request:
No. 90/000,933, Jan. 6, 1986

Reexamination Certificate for:
Patent No.: 4,286,425
Issued: Sep. 1, 1981
Appl. No.: 103,951
Filed: Dec. 14, 1979

[30] Foreign Application Priority Data

Dec. 21, 1978 [DE] Fed. Rep. of Germany ....... 2855234

[51] Int. Cl.$^4$ ............................................ A01D 34/18
[52] U.S. Cl. ......................................... 56/307; 56/298
[58] Field of Search ........................ 56/307, 308, 298

[56] References Cited

U.S. PATENT DOCUMENTS

| | | | |
|---|---|---|---|
| 770,892 | 9/1904 | Crates | 56/304 |
| 992,691 | 5/1911 | Seger et al. | 56/307 |
| 2,234,783 | 3/1941 | Snow | 56/309 |
| 3,553,948 | 1/1971 | White | 56/307 |
| 3,699,758 | 10/1972 | Scarnato et al. | 56/307 |

FOREIGN PATENT DOCUMENTS 43403 3/1971 Australia .
13477 of 1914 United Kingdom .

*Primary Examiner*—Paul J. Hirsch

[57] ABSTRACT

The invention relates to a cutter finger for cutter bar mowers comprising a lower portion bolted at the end to the cutter bar and including a forwardly projecting cutter finger tip from which the upper portion of said finger extends to the rear thus forming the cutter blade slit and constituting together with said lower portion the counter edges for the mower knife wherein said upper portion of said finger is extended to, and supported at, and if necessary bolted at said cutter bar.

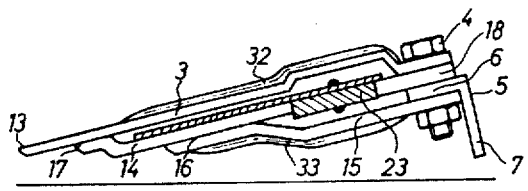

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 6, lines 30–42:

The greater the distance between the upper portion and the lower portion in the range of the cutter finger clamping bolt 4, the greater the stability of the cutter finger in vertical direction. For this reason, cutter rail guide plate 18 is shaped as an intermediate plate bolted, between leg 6 of cutter bar 5 and upper portion 3 of the cutter finger, also by cutter finger clamping bolt 4. The cutter rail guide plate 18 may be a separate part, which during assembling is simply inserted. It may however also be solidly secured to the upper portion 3 of the cutter finger. The provision as a separate part has the advantage that it may, as a wearing part, rapidly and cheaply be replaced. *As seen in FIG. 2, the rearward end of cutter support plate 14 is situated at a location spaced from the cutter bar 6. The holder 15 is fixed to the cutter support plate 14 and to the cutter bar 6 to interconnect them. As also seen in FIG. 2, the forward end of cutter rail guide plate 18 is situated in opposed relationship to the rearward end of cutter support plate 14 defining a space between them in which a cutter rail 23 to which the cutter knife or plate 9 is attached.*

AS A RESULT OF REEXAMINATION, IT HAS BEEN DETERMINED THAT:

Claim 5 is cancelled.

Claims 1–4 and 6–9 are determined to be patentable as amended.

New claims 10–21 are added and determined to be patentable.

1. In a cutter finger apparatus for cutter bar mowers, *a plurality of cutter fingers each* including a lower finger portion fixed to a cutter bar at a rearward end thereof and a separate upper finger portion situated over said lower finger portion and supported by said cutter bar at a rearward end thereof, said upper and lower finger portions *of each finger* defining a [slot] *slit* therebetween adapted to receive a cutter knife therein, said upper and lower finger portions *of each finger* each having forward ends and being fixed to each other at a location forwardly of said knife slit and bolted to each other at a location rearwardly of said knife slit, the improvement comprising: said upper and lower finger portions *of each finger* are each formed by stamped, metallic material; [and] said upper finger portion includes an end portion projecting in the forward direction beyond said forward end of said lower finger portion so that said forward end of said upper finger portion constitutes a cutter finger tip; *at least two adjacent cutter fingers have their lower finger portions interconnected by means of a web located distal from said rearward ends such as to be forwardly of the cutter bar; and wherein said lower finger portion of each respective cutter finger comprises a cutter support plate of stamped metallic material and a holder of stamped metallic material fixedly connected thereto, said cutter support plate of each respective cutter finger being fixed at a forward end thereof to said upper finger portion of said respective cutter finger, and said holder of each respective cutter finger being removably fixed at a rearward end thereof to said upper finger portion of said respective cutter finger at said cutter bar.*

2. The combination of claim 1 wherein [said] *each* lower and upper finger [portions are each] *portion is* provided with a counter edge for the cutter blade.

3. The combination of claim 1 wherein [said] *each* lower finger portion is provided with a reinforcing rib on the outside thereof.

4. The combination of claim 1 wherein [said] *each* upper finger portion is provided with a reinforcing rib on the outside thereof.

6. The combination of claim [5] *1* wherein [said] *each* holder is shaped in form fitting relation with respect to [said] *each* cutter support plate.

7. The combination of claim [5] *1* wherein at least two cutter support plates of respective cutter fingers are mutually connected to each other by connecting bars.

8. The combination of claim 1 further including a lateral cutter rail guide plate provided between [said] *each* upper finger portion and [said] *each* cutter bar.

9. The combination of claim 8 wherein [said] *each* lateral cutter rail plate is connected with [said] *each* upper finger portion.

*10. The combination of claim 1 wherein the web is of integral construction with said interconnected lower finger portions.*

*11. The combination of claim 1 wherein at least two adjacent cutter fingers have their upper finger portions interconnected.*

*12. The combination of claim 11 wherein said interconnected upper finger portions are of integral construction.*

*13. The combination of claim 1 wherein said web interconnects the cutter support members of said interconnected lower finger portions.*

*14. The combination of claim 1 wherein said web interconnects the holder members of said interconnected lower finger portions.*

*15. The combination of claim 1 wherein each cutter support member is connected at one end thereof to the upper finger portion of each finger, and wherein said holder member is adapted to be secured to the cutter bar at the rearward end of the cutter finger.*

*16. The combination of claim 15 wherein each cutter support member is connected at both ends to the holder member of each finger, each holder member being connected at its forward end to the upper finger portion of each finger and being adapted to be secured at its rearward end to the cutter bar.*

*17. The combination of claim 1 wherein the upper and lower finger portions of each finger are of different lengths such that one projects forwardly of the other.*

*18. The combination of claim 17 wherein each upper finger portion includes an end portion projecting in the forward direction beyond the forward end of the lower* finger portion of each finger so that each forward end of said upper finger portion constitutes a cutter finger tip.

19. The combination of claim 1 wherein said cutter support plate of a respective cutter finger has a rearward end which is situated at a location spaced from cutter bar, and said holder of the respective cutter finger interconnects said support plate and said cutter bar.

20. The combination of claim 1 wherein each cutter finger further comprises a cutter rail guide plate fixed at said cutter bar and having a forward end situated in opposed relationship to a rearward end of said cutter support plate defining a space therebetween adapted to receive a cutter rail to which said cutter knife is attached.

21. The combination of claim 1 wherein said cutter support plate of a respective cutter finger is fixed at said forward end thereof to said upper finger portion of said respective cutter finger at a location spaced inwardly from said forward end of said upper finger portion.

* * * * *